United States Patent [19]

Bianco

[11] 3,958,215

[45] May 18, 1976

[54] DEVICE FOR THE ACOUSTIC SUBMARINE TELETYPING

[75] Inventor: Ettore Bianco, San Donato Milanese, Italy

[73] Assignee: Snam Progetti S.p.A., San Donato Milanese, Italy

[22] Filed: Sept. 3, 1971

[21] Appl. No.: 177,759

[30] Foreign Application Priority Data

Sept. 3, 1970 Italy................... 29297/70

[52] U.S. Cl.................... 340/5 R; 325/28
[51] Int. Cl.².......................... H04B 11/00
[58] Field of Search........... 340/5 R, 5 T, 8 S, 16 C; 179/1 UW; 325/28, 116, 118

[56] References Cited
UNITED STATES PATENTS

| | | |
|---|---|---|
| 3,336,571 | 8/1967 | Johnson et al...................... 340/5 R |
| 3,427,554 | 2/1969 | Lagoe et al........................ 340/5 R |
| 3,469,231 | 9/1969 | Geiling et al....................... 340/5 T |

OTHER PUBLICATIONS

"Diver Telemetry System", Sperry Engn. Rev., Vol. 19, No. 3, 1966, pp. 25–30.

Primary Examiner—Richard A. Farley
Attorney, Agent, or Firm—Ralph M. Watson

[57] ABSTRACT

This invention involves the acoustical transmission of messages from an individual operating under water to persons operating on the surface. A wrist-mounted, keyboard-actuated, acoustical signal generator is provided, having means to generate and amplify a coded electrical signal. This coded signal drives a transducer which transmits the message as an acoustical signal.

3 Claims, 2 Drawing Figures

DEVICE FOR THE ACOUSTIC SUBMARINE TELETYPING

The object of the present invention is to provide a device for acoustic submarine teletyping, which allows transmission of letters, numbers and symbols from an operating underwater unit to a surface system receiving, by means of suitably coded acoustic signals. Following propagation through the water; said signals are received decodified and transformed into electric pulses by means of a suitable receiving system. There are in the art various devices for submarine communications among which we cite in particular the telephone having an electric cable and the proper subaqueous telephone.

The subaqueous telephone with an electric cable does not differ substantially from the telephone and is used only where it is convenient to have the receiving and transmitting systems connected to each other by means of a cable. Said telephone is used when information is to be received from or transmitted to a diving bell supported by a mother-ship through a steel-cable. The submarine telephonic cable is joined for communications with a frogman who in turn is connected to the diving-bell through an umbilical cable. The subaqueous telephone is different from a common telephone since the information is transmitted through the water in an acoustical way rather than via cable, permitting therefore the frogman better mobility, always however within the limits of the range of the apparatus. The two systems of subaqueous communication now described have more or less important drawbacks, the main one being the difficulty of the transmission from the frogman.

When the frogman must use a breathing apparatus his ability to talk is greatly hampered by the nosepiece. Further reducing the frogman's ability to communicate is the unfavorable acoustic conditions present within the limited space existing in his headpiece.

A further consideration is a distortion of the frogman's voice caused by the increased pressure and the fact that the composition breathed by the frogman is different from the normal air. An object of the present invention is the elimination of the above mentioned drawbacks allowing further the use of efficacious devices of communication, in all the cases in which it is necessary to undertake submarine activities.

In fact subaqueous work involves remarkable risks, difficulties and costs, and a good communication system requires security for the frogman and the possibility to effect in a better way the required work.

The invention is now particularly described with reference to the enclosed drawings which illustrate a preferential form of the subject invention given by way of example only, it being possible to think of many modifications without departing from the scope of the present invention.

Figure 1:
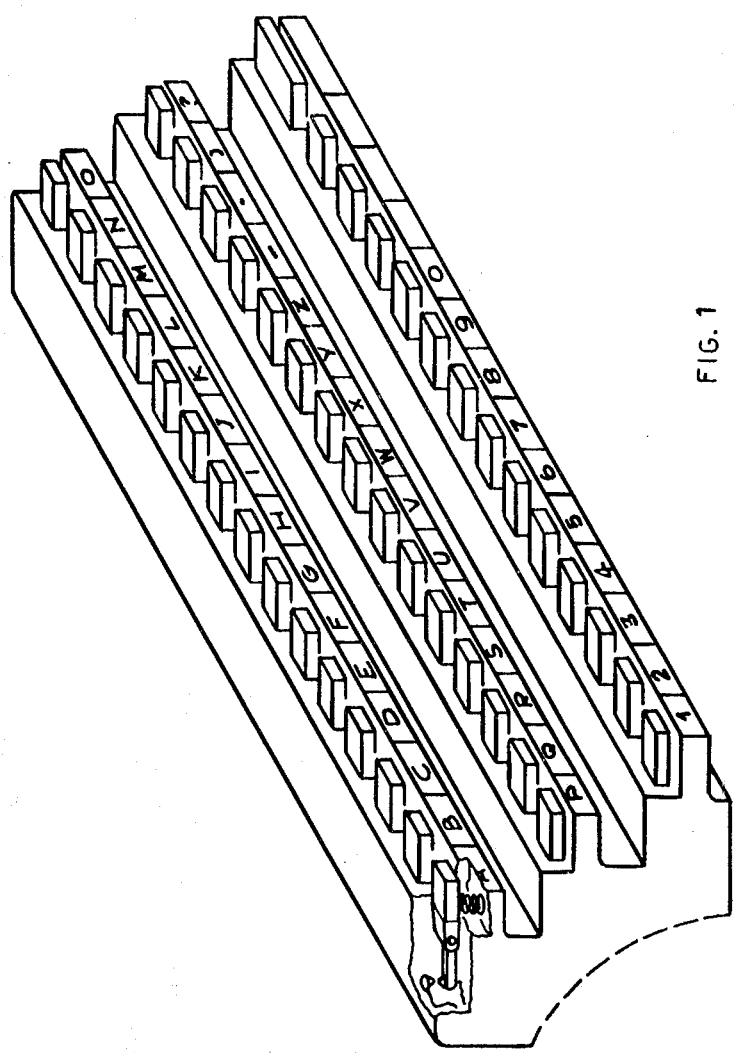
FIG. 1 represents an axonometric view of the writing device object of the present invention.

The device according to the present invention, as shown in FIG. 1, consists of a carrier containing 44 lever switches provided with a return spring, arranged in 3 superposed rows, staggered and lined with rubber in order to make the whole watertight.

The 44 switches can be, e.g., arranged in the following way:
26 for the English alphabet letters
10 for the figures
4 for the symbols, e.g., full stop, comma, question mark, dash
4 for symbols having a particular meaning marked with different colors of which, e.g., red has an emergency meaning.

Every switch corresponds to a letter or number or symbol and is actuated by clasping the switch and the lower support between thumb and forefinger.

It has to be noted that the frogman clasps the keys but does not push them, because while underwater a clasping action is much easier than a pushing action, this latter supposing a mechanical reaction that is not always obtainable.

Figure 2:
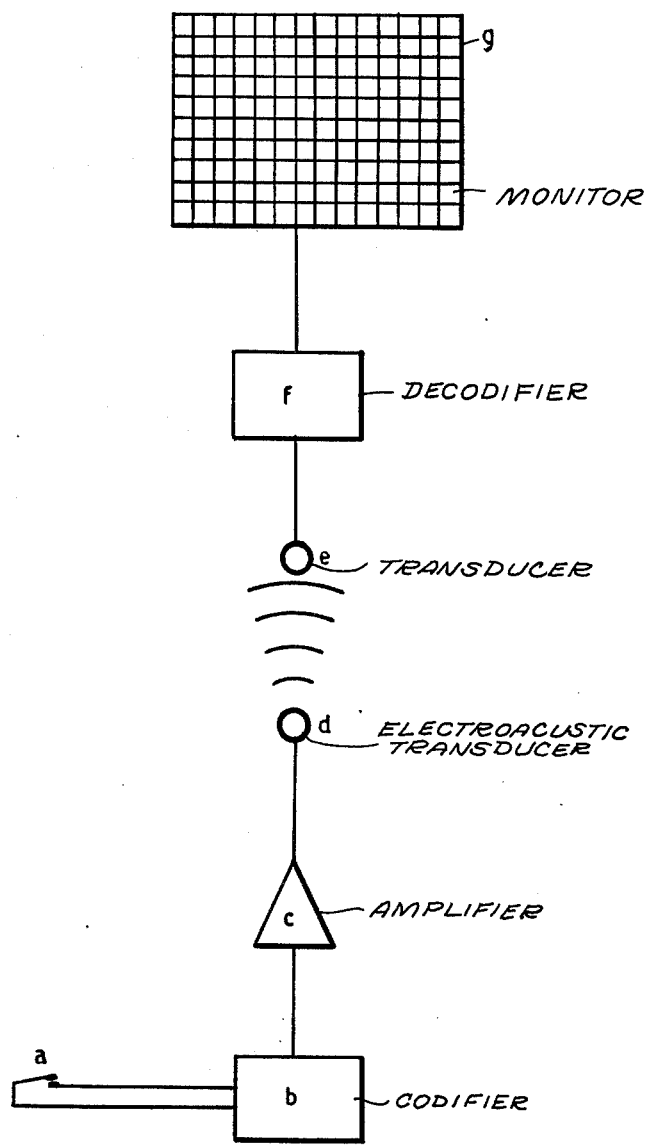
FIG. 2 represents a block diagram of the components of the device according to the present invention.

Said writing device may be fixed on the arm of the frogman by means of rubber belts or may be fixed on the underwater structure close to the work. When a switch of the writing device (indicated by (a) in FIG. 2) is to be set in action, a suitable codifier (b), which may be arranged on the support of the keys and consists of a system of circuits, produces electric pulses in a suitable code in such way that the actuation of each key causes the formation of a different electric signal.

Said pulse emitted by the codifier is amplified by means of amplifier (c) such as to drive the electroacoustic transducer (d) which converts the acoustic signals. Codifier, amplifier and transducer feeding battery may be assembled into the casing containing the keys. Said acoustic signals are propagated through the water and reach the surface where they are transformed into electric pulses by means of transducer (e), decodified in (f) and transformed into electric signals suitable to operate a monitor (g).

Said monitor, which has the function to display the data transmitted by the frogman, may be constituted by a panel having a certain number of cells (about 100) and where driving of a key from the frogman corresponds to the ignition on the lightboard of the relevant symbol, number or sign in succession, so as to form words or different sentences having a complete or conventional meaning.

The present invention eliminate the considerable drawbacks which the underwater operating unit meets while it communicates with the surface, and allows for a clear and unequivocal communication of words or sentences having a complete or conventional meaning. Although the present invention has been described in connection with a particular embodiment, numerous variants and modifications may be thought of without departing from the scope of the present invention.

What I claim is:

1. A device for underwater teletyping utilizing acoustical transmission comprising:
   A. an electric signal generator actuated by a manually operated portable keyboard; having message characters thereon, said signal being generated in a predetermined code corresponding to the keyboard message characters;
   B. an amplifier connected to the signal generating means to amplify the coded signal;
   C. a transducer connected to the amplifier to transform the electrical signal to an acoustical signal; and
   D. means for receiving the acoustical signal and converting said signal into readable form.

2. A device for underwater teletyping utilizing acoustical transmission as described in claim 1 wherein the signal generator, keyboard, amplifier, and transducer are all contained in a case which is of a size allowing it to be attached to the wrist.

3. A device for underwater teletyping utilizing acoustical transmission as described in claim 1 wherein the keys of the keyboard are actuated by a pivotal movement and are situated to allow said keys to be grasped by the operator in order to initiate said pivotal movement.

* * * * *

UNITED STATES PATENT OFFICE
CERTIFICATE OF CORRECTION

Patent No. 3,958,215   Dated May 18, 1976

Inventor(s) Ettore Bianco

It is certified that error appears in the above-identified patent and that said Letters Patent are hereby corrected as shown below:

Column 1, line 4, delete "system".

Column 1, line 5, before "," insert -- system --.

Signed and Sealed this

Thirtieth Day of November 1976

[SEAL]

Attest:

RUTH C. MASON
*Attesting Officer*

C. MARSHALL DANN
*Commissioner of Patents and Trademarks*